(12) United States Patent
Hwang et al.

(10) Patent No.: US 12,482,900 B2
(45) Date of Patent: Nov. 25, 2025

(54) BATTERY CELL ASSEMBLY AND BATTERY PACK INCLUDING THE SAME

(71) Applicant: SK On Co., Ltd., Seoul (KR)

(72) Inventors: Jae Il Hwang, Daejeon (KR); Min Song Kang, Daejeon (KR); Bon Seok Ku, Daejeon (KR); Jun Hee Jung, Daejeon (KR); Sei Hoon Cho, Daejeon (KR); Jin Su Han, Daejeon (KR)

(73) Assignee: SK On Co., Ltd., Seoul (KR)

( * ) Notice: Subject to any disclaimer, the term of this patent is extended or adjusted under 35 U.S.C. 154(b) by 101 days.

(21) Appl. No.: 17/676,479

(22) Filed: Feb. 21, 2022

(65) Prior Publication Data

US 2022/0271395 A1 Aug. 25, 2022

(30) Foreign Application Priority Data

Feb. 22, 2021 (KR) .................. 10-2021-0023470

(51) Int. Cl.
*H01M 50/503* (2021.01)
*H01M 50/211* (2021.01)
(Continued)

(52) U.S. Cl.
CPC ....... *H01M 50/503* (2021.01); *H01M 50/211* (2021.01); *H01M 50/507* (2021.01); *H01M 50/533* (2021.01); *H01M 2220/20* (2013.01)

(58) Field of Classification Search
CPC .... H01M 50/20; H01M 50/12; H01M 50/184; H01M 50/211; H01M 50/264; H01M 50/271; H01M 50/291; H01M 50/503; H01M 50/507; H01M 50/514; H01M 50/517; H01M 50/533; H01M 10/647; H01M 10/658; H01M 10/655; H01M 10/6551; H01M 10/6554; H01M 2220/20; H01M 10/613; H01M 50/505; H01M 50/502; H01M 50/209; H01M 50/105; H01M 50/249; H01M 50/24; H01M 50/244; H01M 50/204; H01M 50/383; H01M 50/289; H01M 50/548; H01M 50/593;
(Continued)

(56) References Cited

U.S. PATENT DOCUMENTS 10,873,114 B2 12/2020 Ju et al.
2017/0237131 A1* 8/2017 Gunna ................. H01M 50/20
429/120

(Continued)

FOREIGN PATENT DOCUMENTS

DE 102018133391 A1 6/2019
KR 101127275 B1 * 4/2012 ........ H01M 10/0404
(Continued)

OTHER PUBLICATIONS

KR20180119372A—Machine Translation—Espacenet (Accessed Jun. 14, 2023) (Year: 2023).*
KR 101127275 B1—English translation via Espacenet (Year: 2012).*

*Primary Examiner* — Allison Bourke
*Assistant Examiner* — Bethany C Garcia
(74) *Attorney, Agent, or Firm* — The Webb Law Firm

(57) ABSTRACT

A battery cell assembly includes a plurality of battery cells, a bus-bar assembly to which electrode leads of the plurality of battery cells are coupled, and a barrier interposed between the plurality of battery cells and coupled to the bus-bar assembly.

10 Claims, 8 Drawing Sheets

(51) Int. Cl.
*H01M 50/507* (2021.01)
*H01M 50/533* (2021.01)

(58) Field of Classification Search
CPC ............ H01M 10/653; H01M 10/617; H01M 10/6557; H01M 10/563; H01M 50/516; H01M 50/262; H01M 50/293; H01M 50/59; H01M 50/588; H01M 2220/00; Y02E 60/10; Y02T 10/70; Y02P 70/50; B60L 58/26; B60L 50/64
See application file for complete search history.

(56) References Cited

U.S. PATENT DOCUMENTS

| | | | |
|---|---|---|---|
| 2018/0183119 A1* | 6/2018 | Ju | .................... H01M 50/502 |
| 2018/0190952 A1 | 7/2018 | Kim et al. | |
| 2019/0067762 A1* | 2/2019 | Zhang | ................. H01M 50/244 |
| 2019/0198952 A1 | 6/2019 | Choi et al. | |
| 2019/0272957 A1 | 9/2019 | Tononishi | |
| 2019/0319250 A1* | 10/2019 | Compton | ............ H01M 50/211 |
| 2020/0099114 A1* | 3/2020 | Ryu | .................... H01M 10/658 |
| 2020/0287180 A1* | 9/2020 | Chen | ..................... H01M 50/30 |
| 2021/0320374 A1 | 10/2021 | Lee et al. | |
| 2022/0158308 A1 | 5/2022 | Chi et al. | |

FOREIGN PATENT DOCUMENTS

| | | | | |
|---|---|---|---|---|
| KR | 101326182 B1 | 11/2013 | | |
| KR | 1020170053110 A | 5/2017 | | |
| KR | 1020180074133 A | 7/2018 | | |
| KR | 20180119372 A | * 11/2018 | ............ H01M 10/48 |
| KR | 1020190094921 A | 8/2019 | | |
| KR | 1020200110082 A | 9/2020 | | |
| WO | 2020179994 A1 | 9/2020 | | |

\* cited by examiner

BATTERY CELL ASSEMBLY AND BATTERY PACK INCLUDING THE SAME

CROSS-REFERENCE TO RELATED APPLICATION

This application claims priority to Korean Patent Application No. 10-2021-0023470 filed Feb. 22, 2021, the disclosure of which is hereby incorporated by reference in its entirety.

BACKGROUND OF THE INVENTION

1. Field of the Invention

Example embodiments of the present disclosure relate to a battery cell assembly and a battery pack including the same.

2. Description of Related Art

As technological development and demand for mobile devices, electric vehicles, or the like, have increased, the demand for battery cells as an energy source has rapidly increased. A battery cell may be repeatedly charged and discharged as conversion between chemical energy and electrical energy is reversible.

However, battery cells may generate heat while being charged and discharged, such that a battery cell among the battery cells may explode due to an increase of temperature of the battery cells, or may explode due to external impacts, which may be problematic.

Further, the explosion of one of the battery cells may cause high temperature and high pressure in the other battery cells, such that the battery cells may explode consecutively.

Therefore, to address the above-mentioned issues or limitations, studies into a battery pack have been necessary.

SUMMARY OF THE INVENTION

An example embodiment of the present disclosure is to provide a battery cell assembly which may address the issue of consecutive explosion of battery cells caused by flames, gas, or the like, generated by an explosion of one of the battery cells, and a battery pack including the same.

An example embodiment of the present disclosure is to provide a battery cell assembly which may allow a barrier to be easily installed, and a battery pack including the same.

An example embodiment of the present disclosure is to, by increasing capacity of a battery cell, increase total capacity of a battery pack including a plurality of battery cell assemblies.

According to an example embodiment of the present disclosure, a battery cell assembly includes a plurality of battery cells, a bus-bar assembly to which electrode leads of the plurality of battery cells are coupled, and a barrier interposed between the plurality of battery cells and coupled to the bus-bar assembly.

The bus-bar assembly may include a bus-bar frame having a lead hole into which the electrode lead is inserted, and a support tab protruding from the bus-bar frame toward the battery cells, wherein an end of the barrier is inserted into the support tab.

The support tab may include a pair of side tabs protruding to oppose both side surfaces of the end of the barrier, respectively, and a blocking tab opposing at least one of an upper portion and a lower portion of the end of the barrier and configured to connect the pair of side tabs to each other.

The pair of side tabs may be spaced apart from each other and form a gap, and a width of the gap of a lower end may be greater than a width of the gap of an upper end.

The pair of side tabs may be formed such that a lower end thereof may protrude further than an upper end from the bus-bar frame in a direction of the at least one of the battery cells.

The support tab may include a pair of side tabs protruding to oppose both side surfaces of the end of the barrier, and the barrier may include a barrier plate opposing a side surface of the battery cell, and a snap portion protruding from ends of the barrier plate to both sides configured to be caught on a hook formed on internal surfaces of the pair of side tabs.

The snap portion is formed that a front surface opposing the bus-bar assembly may be tapered.

The barrier may include a barrier plate opposing a side surface of the at least one of the battery cells, a seating block configured to protrude from a lower side surface of the end of the barrier plate in a direction of the bus-bar frame such that a lower end of the support tab is seated, and a confinement post spaced apart from the barrier plate, configured to protrude upwardly from the seating block, and inserted into an accommodation groove formed upwardly from the lower end of the support tab.

The barrier may include a barrier plate opposing a side surface of the at least one of the battery cells, and a fastening block provided on a lower portion of the end of the barrier plate, configured to have a thickness greater than that of the barrier plate, and fastened to the bus-bar assembly by bolts.

The barrier may be formed of a material including at least one of a mica material, a metal material, and a resin material.

The barrier may include a buffer pad on an external surface.

The electrode lead may be welded and coupled to the bus-bar of the bus-bar assembly while an end thereof is disposed in a lead hole formed in the bus-bar assembly.

The electrode lead may penetrate through a lead hole formed in the bus-bar assembly and may be bent to be welded and coupled to the bus-bar of the bus-bar assembly, and a first electrode lead disposed on one end of the bus-bar may be bent in a direction opposite to a second electrode lead, the other electrode lead.

According to an example embodiment of the present disclosure, a battery pack includes a plurality of battery cell assemblies, and a pack housing accommodating the plurality of battery cell assemblies, wherein the plurality of battery cell assemblies include a plurality of battery cells including electrode leads, a bus-bar assembly coupled to the electrode lead, and a barrier interposed between the plurality of battery cells and coupled to the bus-bar assembly.

The plurality of battery cells may be seated on a thermal conductive material disposed on the pack housing.

BRIEF DESCRIPTION OF DRAWINGS

The above and other aspects, features, and advantages of the present disclosure will be more clearly understood from the following detailed description, taken in conjunction with the accompanying drawings, in which.

DESCRIPTION OF THE INVENTION

Figure 1:
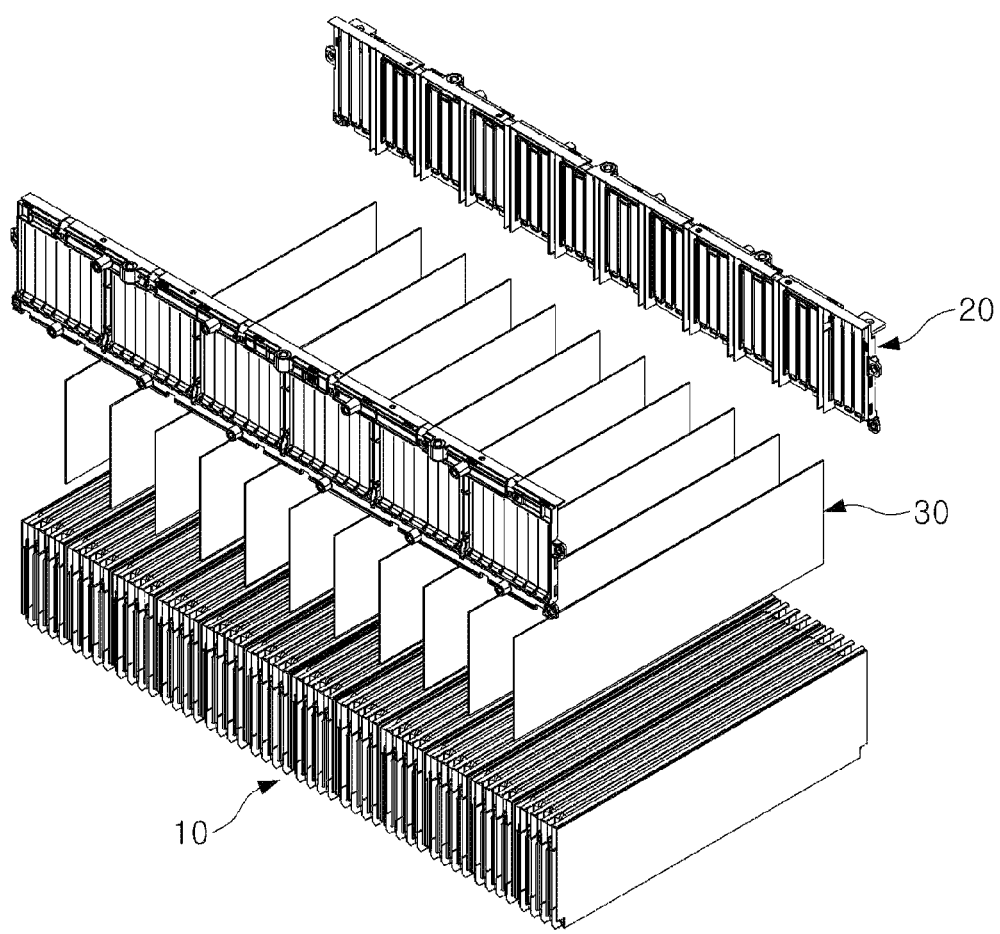
FIG. 1 is an exploded perspective diagram illustrating a battery cell assembly according to an example embodiment of the present disclosure.

It is to be understood that the terms or words used in this description and the following claims must not be construed to have meanings which are general or may be found in a dictionary. Therefore, considering the notion that an inventor may most properly define the concepts of the terms or words to best explain his or her invention, the terms or words must be understood as having meanings or concepts that conform to the technical spirit of the present disclosure. Also, since the example embodiments set forth herein and the configurations illustrated in the drawings are nothing but a mere example and are not representative of all technical spirits of the present disclosure, it is to be understood that various equivalents and modifications may replace the example embodiments and configurations at the time of the present application.

In the drawings, same elements will be indicated by same reference numerals. Also, redundant descriptions and detailed descriptions of known functions and elements that may unnecessarily make the gist of the present disclosure obscure will be omitted. In the accompanying drawings, some components may be exaggerated, omitted or briefly illustrated, and the sizes of the elements do not necessarily reflect the actual sizes of these elements.

Figure 2:
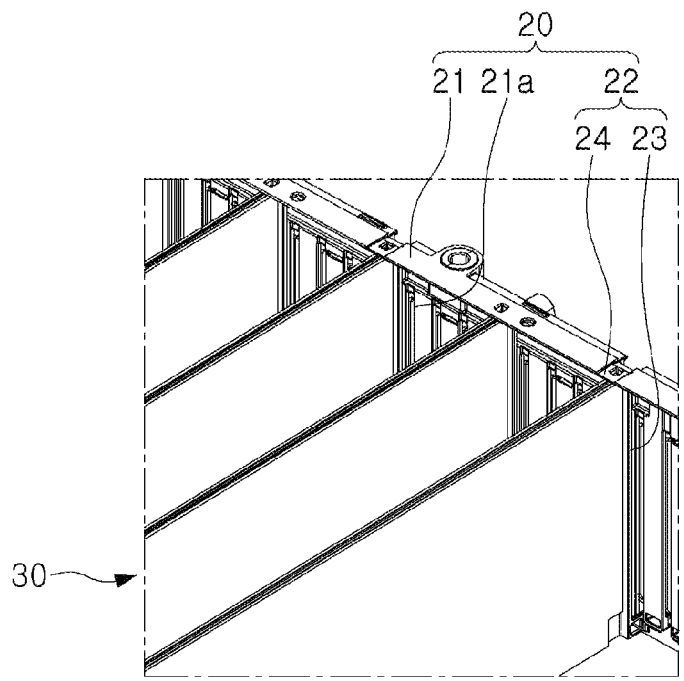
FIG. 2 is a perspective diagram illustrating a portion of a battery cell assembly in which a barrier is fastened to a bus-bar assembly according to an example embodiment of the present disclosure.

FIG. 1 is an exploded perspective diagram illustrating a battery cell assembly 1 according to an example embodiment. FIG. 2 is a perspective diagram illustrating a portion of a battery cell assembly 1 in which a barrier 30 is fastened to a bus-bar assembly 20 according to an example embodiment.

Figure 3:
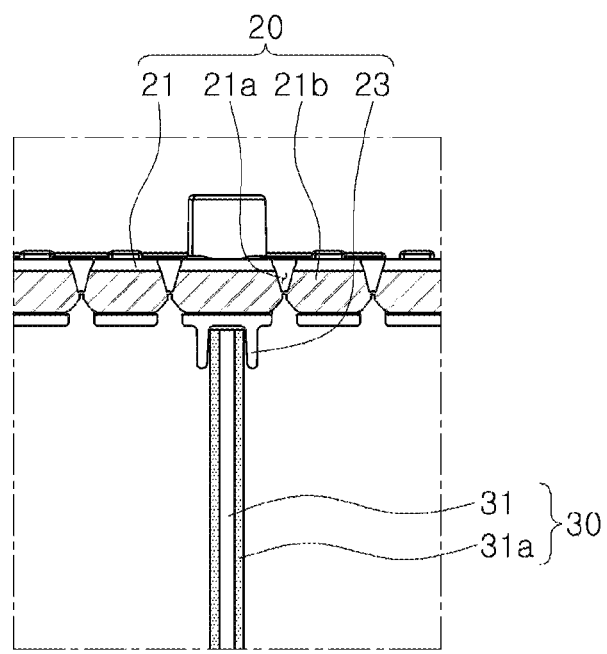
FIG. 3 is a plan diagram illustrating a state in which a barrier is partially inserted into a support tab in a battery cell assembly according to an example embodiment of the present disclosure.
Figure 4:
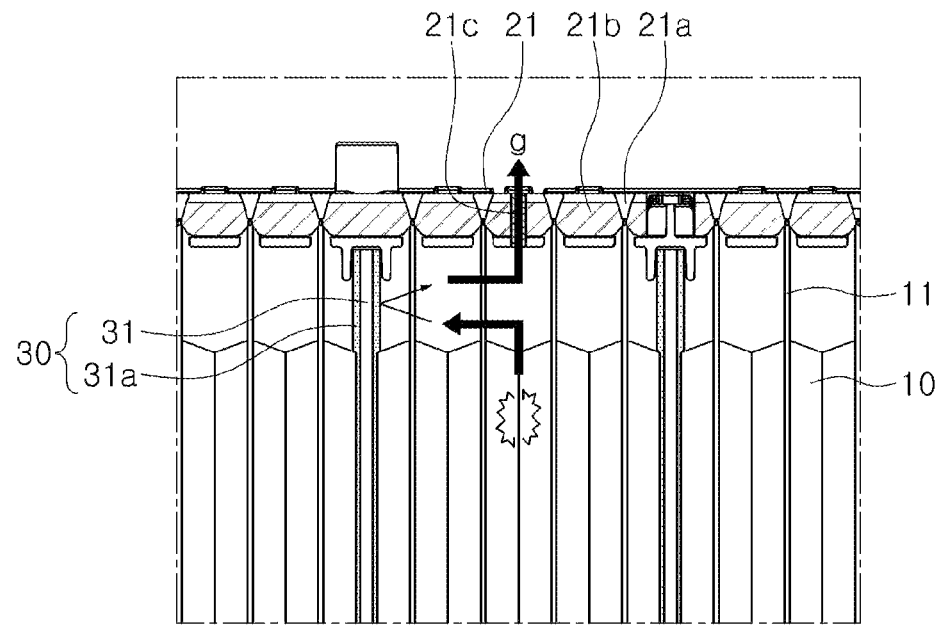
FIG. 4 is a plan diagram illustrating a state in which flames and gas generated by battery cells in a battery cell assembly are not spread by a barrier and are discharged through a vent hole according to an example embodiment of the present disclosure.

FIG. 3 is a plan diagram illustrating a state in which a barrier 30 is partially inserted into a support tab 22 in a battery cell assembly 1 according to an example embodiment. FIG. 4 is a plan diagram illustrating a state in which flames and gas g generated by battery cells 10 in a battery cell assembly 1 are not spread by a barrier 30 and are discharged through a vent hole 21c according to an example embodiment.

Referring to the drawings, the battery cell assembly 1 in an example embodiment may include a plurality of battery cells 10, a bus-bar assembly 20, and a barrier 30.

Here, the bus-bar assembly 20 may be coupled to electrode leads 11 of the plurality of battery cells 10. The barrier 30 may be interposed between the plurality of battery cells 10, and an end thereof may be fastened to the bus-bar assembly 20. Accordingly, for example, the space in which the battery cells 10 on both sides of the barrier 30 are disposed may be separated.

That is, since the barrier 30 covers the side surface of the battery cell 10 and the battery cell 10 is disposed in the separated space formed by fastening (or coupling) the end of the barrier 30 to the bus-bar assembly 20, the issue in which the consecutive explosion of the battery cells 10 caused by flames and the gas g generated by one of the battery cells 10 may be addressed.

In other words, in addition to simply disposing the barrier 30 between the battery cells 10, by fastening the element to the bus-bar assembly 20, the effect of preventing flames and the gas g from spreading may improve.

The battery cell assembly 1 in the example embodiment may be configured in the form of a battery module, may be manufactured as a battery pack, and may be installed in an electrical vehicle or the like, or the process of manufacturing the battery cell assembly 1 as a battery module may not be performed and the battery cell assembly 1 may be installed in an in the electrical vehicle form of a battery pack (cell to pack; CTP), such that electrical capacity of the battery pack may increase.

Here, the battery cell 10 may include an electrode assembly and a cell body member surrounding the electrode assembly.

The electrode assembly may substantially include electrolyte and may be accommodated in the cell body member together. The electrolyte may include an organic solvent such as ethylene carbonate (EC), propylene carbonate (PC), diethyl carbonate (DEC), ethyl methyl carbonate (EMC), or dimethyl carbonate (DMC) and a lithium salt such as $LiPF_6$ or $LiBF_4$. Further, the electrolyte may be in the form of a liquid, solid or gel.

The cell body member may be configured to protect the electrode assembly and to accommodate the electrolyte, and for example, the cell body member may be provided as a pouch-type member or a can-type member. Here, the pouch-type member may be configured to seal and accommodate the electrode assembly on three sides, and the three surfaces, which are an upper surface portion and both side surface portions, other than one surface portion which is one surface portion, may be folded and bonded to seal the electrode assembly while the electrode assembly is accommodated therein. Also, the can-type member may seal and accommodate the electrode assembly on one surface, and a single surface, which is an upper surface portion, other than four surfaces which are a lower surface portion and side surface portions, may be bonded to seal the electrode assembly while the electrode assembly is accommodated.

However, the pouch-type battery cell 10 and the can-type battery cell 10 are merely examples of the battery cells 10 included in the battery cell assembly 1 in the example embodiment, and the type of the battery cell 10 included in the battery cell assembly 1 is not limited to the aforementioned example.

The bus-bar assembly 20 may be coupled to the plurality of battery cells 10, and may entirely support the plurality of battery cells 10, and may allow the plurality of battery cells 10 to be electrically connected to an external entity.

To this end, the bus-bar assembly 20 may include a bus-bar frame 21. A plurality of lead holes 21a to which the electrode leads 11 of the battery cells 10 are coupled may be formed in the bus-bar frame 21. Accordingly, the entirety of the plurality of battery cells 10 may be coupled to the bus-bar assembly 20 via the electrode lead 11.

In this case, as an example of a method of coupling the electrode lead 11 to the bus-bar assembly 20, an end of the electrode lead 11 may be welded to the bus-bar 21b disposed in the lead hole 21a formed in the bus-bar assembly 20.

Accordingly, since the electrode lead 11 penetrating through the lead hole 21a does not protrude, the space occupied by the battery cell assembly 1 may be reduced.

Alternatively, the electrode lead 11 may be configured to penetrate through the lead hole 21a and to be bent, and a detailed description thereof will be described later with reference to FIGS. 10A and 10B.

The bus-bar assembly 20 may include a support tab 22. The end of the barrier 30 may be fastened to the bus-bar assembly 20 by the support tab 22.

Accordingly, in the battery cell assembly 1 in the example embodiment, the barrier 30 may be easily installed.

As described above, the bus-bar assembly 20 of the battery cell assembly 1 in an example embodiment may include a bus-bar frame 21 having a lead hole 21a into which the electrode lead 11 is inserted, and a support tab 22 protruding toward the battery cell 10 and an end of the barrier 30 is inserted into the support tab 22.

Here, the support tab 22 may include a side tab 23 for guiding the movement of the barrier 30 when the barrier 30 is fastened. Also, the support tab 22 may further include a blocking tab 24 limiting a fastening position of the barrier 30.

A pair of the side tab 23 may be provided and may protrude to oppose both side surfaces of the end of the barrier 30, respectively. The blocking tab 24 may oppose at least one of an upper portion and a lower portion of the end of the barrier 30, and may connect the pair of side tabs 23 to each other.

Also, the pair of side tabs 23 may be formed such that a gap width W therebetween may gradually increase from the upper end to the lower end, and a detailed description thereof will be described later with reference to FIG. 5.

The side tab 23 may more specifically specify a protruding shape thereof, protruding from the bus-bar frame 21, and a detailed description thereof will be described later with reference to FIGS. 6A and 6B.

Also, the bus-bar assembly 20 of the battery cell assembly 1 in an example embodiment may include a bus-bar frame 21 and a support tab 22, and a hook 23a may be formed on the side tab 23 23a and may be fastened to the snap portion 32 of the barrier 30. A detailed description thereof will be described later with reference to FIG. 9.

The bus-bar assembly 20 may have a vent hole 21c for discharging flames and the gas g, generated in the battery cell 10 to the outside. Accordingly, flames and the gas g, generated in one of the battery cells 10 may not pass over the barrier 30 may not spread to the other battery cells 10, and may be discharged to the outside through the vent hole 21c.

The barrier 30 may be configured to prevent flames and the gas g generated by the explosion of one battery cell 10 from spreading to the adjacent battery cells 10. To this end, the barrier 30 may cover the side surface of the battery cell 10, and an end of the barrier 30 may be fastened to the bus-bar assembly 20. Accordingly, the battery cells 10 on both sides may be spatially separated from each other with respect to the barrier 30 as the center, and accordingly, the explosion of the battery cells 10 in one region may be prevented from affecting the battery cells 10 in the other region.

To this end, for example, the barrier 30 may be disposed for each battery cell 10 of a certain number of units among the plurality of battery cells 10. In this case, the barrier 30 may be provided between adjacent battery cells 10, thereby covering the side surface of the battery cell 10. For example, the barrier 30 may be installed for every four battery cells 10 and may spatially separate the four battery cells 10 from each other. Accordingly, when one of the four battery cells 10 explodes, only the four battery cells 10 may consecutively explode to the maximum, and further explosion may be prevented by the barrier 30 and the bus-bar assembly 20.

The barrier 30 may include the barrier plate 31 and the fastening block 35, and accordingly, the barrier 30 may be fastened to the bus-bar assembly 20 by the bolts 35a. A detailed description thereof will be described later with reference to FIG. 8.

The barrier 30 of the battery cell assembly 1 in an example embodiment may be formed of a material including at least one of a mica material, a metal material, and a resin material. Here, a mica material, a metal material, and a resin material may not have a hole formed therein by the high-temperature flame and gas g.

For example, as the metal material, a material such as iron (Fe), copper (Cu), aluminum (Al), and the like may be used, and the metal material may be a metal alloy or may be heat-treated. As the resin material, for example, plastics such as synthetic resins may be used. Also, the mica material, the metal material, and the resin material may be synthesized or mixed to form the barrier 30.

Also, the barrier 30 of the battery cell assembly 1 in an example embodiment may include a buffer pad 31a on the external surface. By providing the compression member, the battery cell 10 in contact with the barrier 30 may be firmly protected, and the swelling caused by the swelling of the battery cell 10 may be buffered. That is, the buffer pad 31a may be compressed and elastically deformed when a specific battery cell 10 expands. Accordingly, the expansion of the entire volume of the stack of the plurality of battery cells 10 may be prevented. For example, the material of the buffer pad 31a may be a foam-type material such as polyurethane foam, but an example embodiment thereof is not limited thereto.

Figure 5:
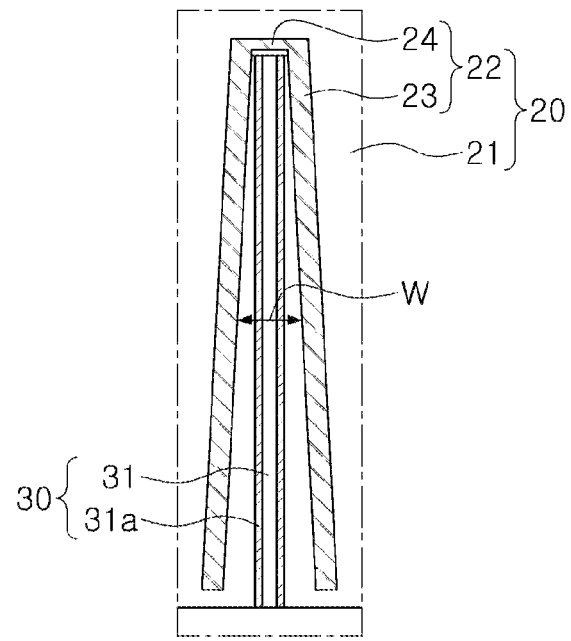
FIG. 5 is a diagram illustrating an example embodiment in which a gap width between a pair of side tabs in a battery cell assembly gradually increases from an upper end to a lower end, viewed from the front.

FIG. 5 is a diagram illustrating an example embodiment in which a gap width W between a pair of side tabs 23 in a battery cell assembly 1 gradually increases from an upper end to a lower end, viewed from the front.

Referring to the drawings, the pair of side tabs 23 of the battery cell assembly 1 in an example embodiment may be spaced apart from each other such that a gap may be formed therebetween, the gap width W, on the lower end, may be greater than that on the upper end.

Accordingly, the stack in which the battery cell 10 and the barrier 30 are stacked may be easily assembled to the bus-bar assembly 20. That is, the bus-bar assembly 20 may move downwardly to the stack of the battery cells 10 and the barrier 30 and may be assembled, and since the gap widths W of the lower ends of the pair of side tabs 23 is wide, the barrier 30 may be easily disposed, and the components may be easily assembled.

Figure 6A:
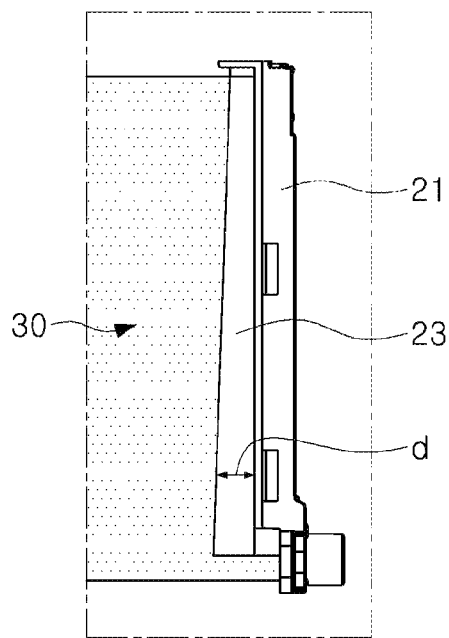
FIGS. 6A and 6B are diagrams illustrating an example embodiment in which a side tab is configured to protrude from a bus-bar frame in a battery cell assembly, viewed from the side.
Figure 6B:
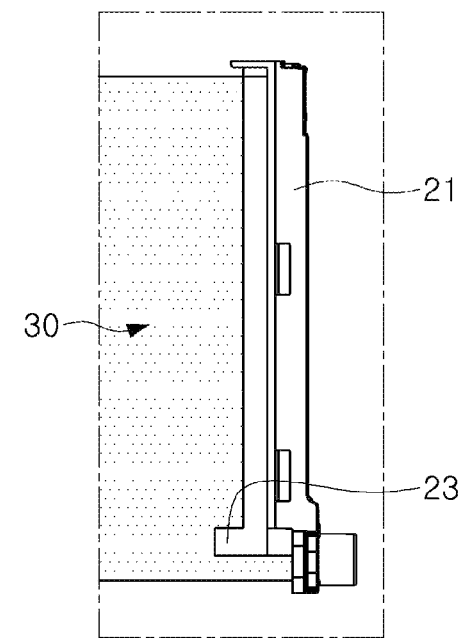

FIGS. 6A and 6B are diagrams illustrating an example embodiment in which a side tab 23 is configured to protrude from a bus-bar frame 21 in a battery cell assembly 1, viewed from the side.

Referring to the drawings, the pair of side tabs 23 of the battery cell assembly 1 in an example embodiment may further protrude from the bus-bar frame 21 in the direction of the battery cell 10 from the upper and to the lower end, which may further refer to FIG. 6A.

Alternatively, the pair of side tabs 23 of the battery cell assembly 1 in an example embodiment may be configured such that the lower end thereof may further protrude from the bus-bar frame 21 in the direction of the battery cell 10 than the upper end, which may further refer to FIG. 6B.

By limiting the shape of the pair of side tabs 23 as above, the stack in which the battery cell 10 and the barrier 30 are stacked may be easily assembled to the bus-bar assembly 20. That is, the bus-bar assembly 20 may move downwardly and may be assembled into the stack of the battery cell 10 and the barrier 30, and the lower end of the pair of side tabs 23 may be formed to have the length d which further protrudes in the direction of the battery cell 10, such that the effect of preventing the barrier 30 from being separated may improve, and the components may be easily and stably assembled.

Figure 7:
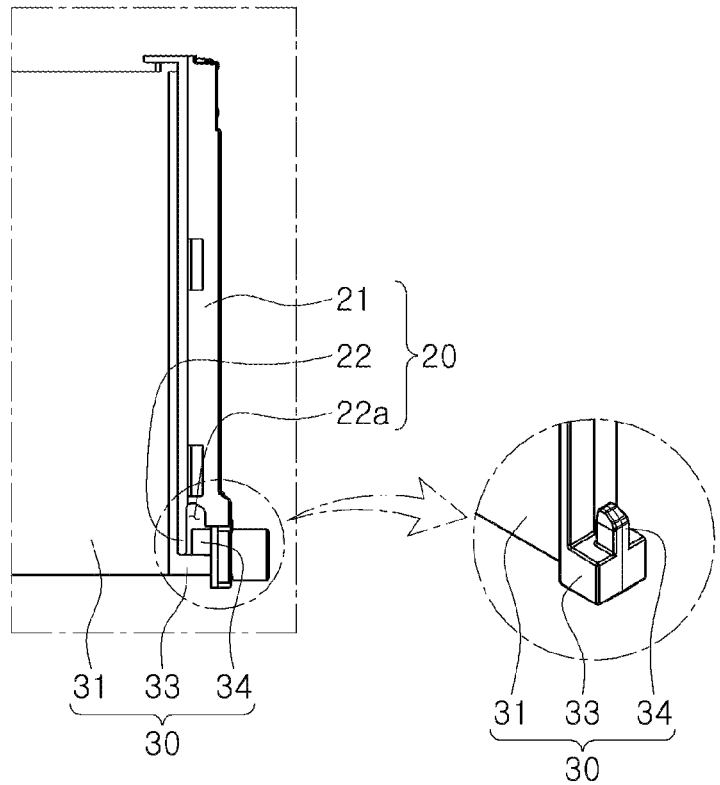
FIG. 7 is a diagram illustrating an example embodiment in which a barrier includes a confinement post in a battery cell assembly, viewed from the side.

FIG. 7 is a diagram illustrating an example embodiment in which a barrier 30 includes a confinement post 34 in a battery cell assembly 1, viewed from the side.

Referring to the drawings, the barrier 30 of the battery cell assembly 1 in an example embodiment may include a barrier plate 31, a seating block 33, and a confinement post 34.

Here, the barrier plate 31 may be disposed to oppose the side surface of the battery cell 10. The seating block 33 may be formed to protrude from the lower surface of the end of the barrier plate 31 in the direction of the bus-bar frame 21 such that the lower end of the support tab 22 is seated therein. The confinement post 34 may be spaced apart from the barrier plate 31 by a predetermined distance, may protrude upwardly from the seating block 33, may move upwardly from the lower end of the support tab 22, and may be inserted into an accommodating groove 22a.

That is, the lower end of the support tab 22 may be configured to be caught between the end of the barrier plate 31 and the confinement post 34. Accordingly, the barrier 30 may be firmly fastened to the bus-bar assembly 20.

Figure 8:
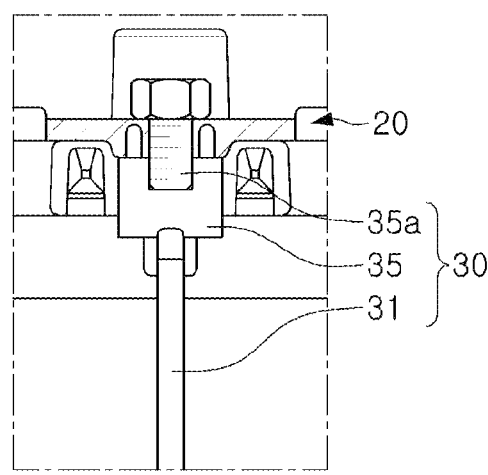
FIG. 8 is a plan diagram illustrating an example embodiment in which a barrier includes a fastening block in a battery cell assembly.

FIG. 8 is a plan diagram illustrating an example embodiment in which a barrier 30 includes a fastening block 35 in a battery cell assembly 1.

Referring to the drawings, the barrier 30 of the battery cell assembly 1 in an example embodiment may include a barrier plate 31 and a fastening block 35.

The blocking plate 31 may be disposed to oppose the side surface of the battery cell 10. The fastening block 35 may be integrated with the end of the barrier plate 31, may have a thickness greater than that of the barrier plate 31, and may be fastened to the bus-bar assembly 20 by bolts 35a.

That is, by providing the fastening block 35, the barrier 30 and the bus-bar assembly 20 may be fastened to each other by the bolts 35a. By fastening the components by the bolts 35a, the barrier 30 and the bus-bar assembly 20 may be firmly fastened to each other.

Figure 9:
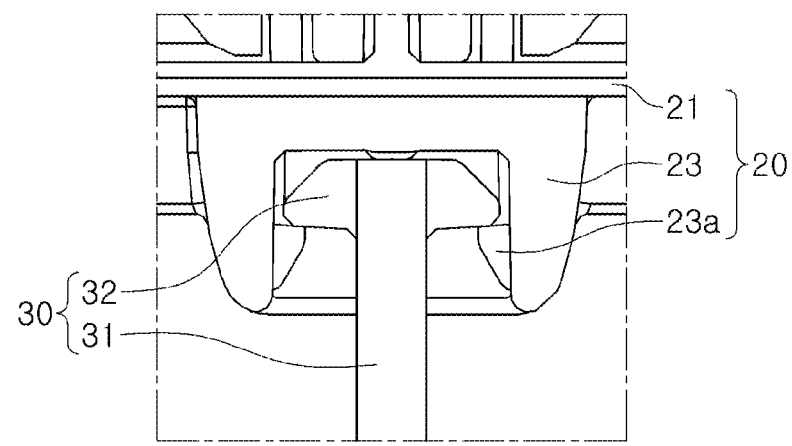
FIG. 9 is a plan diagram illustrating an example embodiment in which a barrier includes a snap portion in a battery cell assembly.

FIG. 9 is a plan diagram illustrating an example embodiment in which a barrier 30 includes a snap portion 32 in a battery cell assembly 1.

Referring to the drawing, the support tab 22 of the battery cell assembly 1 in an example embodiment may include a pair of side tabs 23 protruding to oppose both side surfaces of the end of the barrier 30, respectively. The barrier 30 may include a barrier plate 31 and a snap portion 32.

Here, the barrier plate 31 may be disposed to oppose the side surface of the battery cell 10. The snap portion 32 may protrude from both sides of the end of the barrier plate 31 so as to be caught by the hooks 23a formed on the internal surfaces of the pair of side tabs 23.

That is, the snap portion 32 of the barrier 30 and the hook 23a of the bus-bar assembly 20 may be configured to be fastened to each other by a snapping operation. Accordingly, the bus-bar assembly 20 may be horizontally moved in the direction of the stack in which the battery cells 10 and the barrier 30 are stacked and may be fastened to the barrier 30.

To fasten the bus-bar assembly 20 and the barrier 30 by the snapping operation, the snap portion 32 of the battery cell assembly 1 in an example embodiment may have a front surface facing the bus-bar assembly 20 to be tapered. The tapered shape of the snap portion 32 may be of the example in which the bus-bar assembly 20 is horizontally moved and fastened.

When the bus-bar assembly 20 is moved in a different direction and is fastened to the barrier 30, the tapered shape of the snap portion 32 may be formed on a surface disposed in the other direction.

Figure 10A:
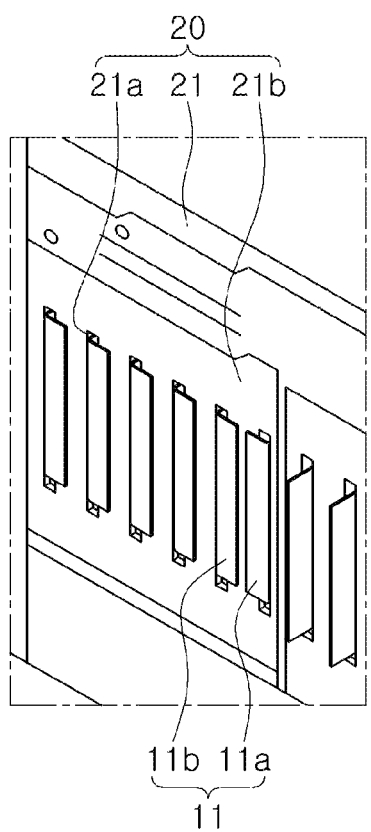
FIGS. 10A and 10B are perspective diagrams illustrating an example embodiment in which an electrode lead is bent in a battery cell assembly.
Figure 10B:
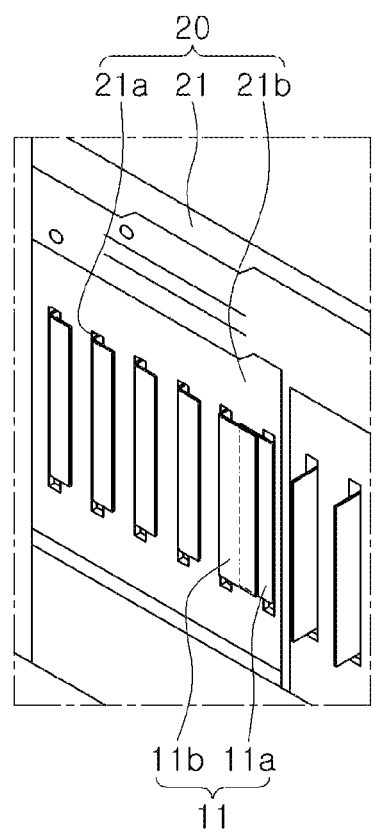

FIGS. 10A and 10B are perspective diagrams illustrating an example embodiment in which an electrode lead 11 is bent in a battery cell assembly 1.

Referring to the drawing, the electrode lead 11 of the battery cell assembly 1 in an example embodiment may penetrate through the lead hole 21a formed in the bus-bar assembly 20, may be bent, and may be welded to the bus-bar 21b of the bus-bar assembly 20, and the first electrode lead 11a disposed on one end of the bus-bar 21b may be bent in a direction opposite to the second electrode lead 11b, which is the other electrode lead 11.

That is, the electrode lead 11 may be configured to be bent after penetrating through the lead hole 21a, such that the space occupied by the battery cell assembly 1 may be reduced.

Alternatively, the electrode lead 11 may be configured to be bent after penetrating through the lead hole 21a, such that the region in which the bent electrode lead and the bus-bar are in electrically contact with each other may increase, thereby reducing electrical resistance.

Further, as the electrode lead 11 is configured to be bent, and the electrode lead 11 and the bus-bar 21b are welded to each other, the bus-bar assembly 20 and the battery cell 10 may be firmly coupled to each other.

In the electrode lead 11 of the battery cell assembly in an example embodiment, the first electrode lead 11a disposed on one end of the bus-bar 21b of the bus-bar assembly 20 may be bent in a direction opposite to the second electrode lead 11b, which is the other electrode lead 11, and may partially overlap as in FIG. 10B.

Accordingly, the region occupied by the bus-bar 21b electrically fastened to the bent electrode lead 11 may be reduced, such that the space occupied by the battery cell assembly may be reduced, and a compact structure may be implemented.

Figure 11:
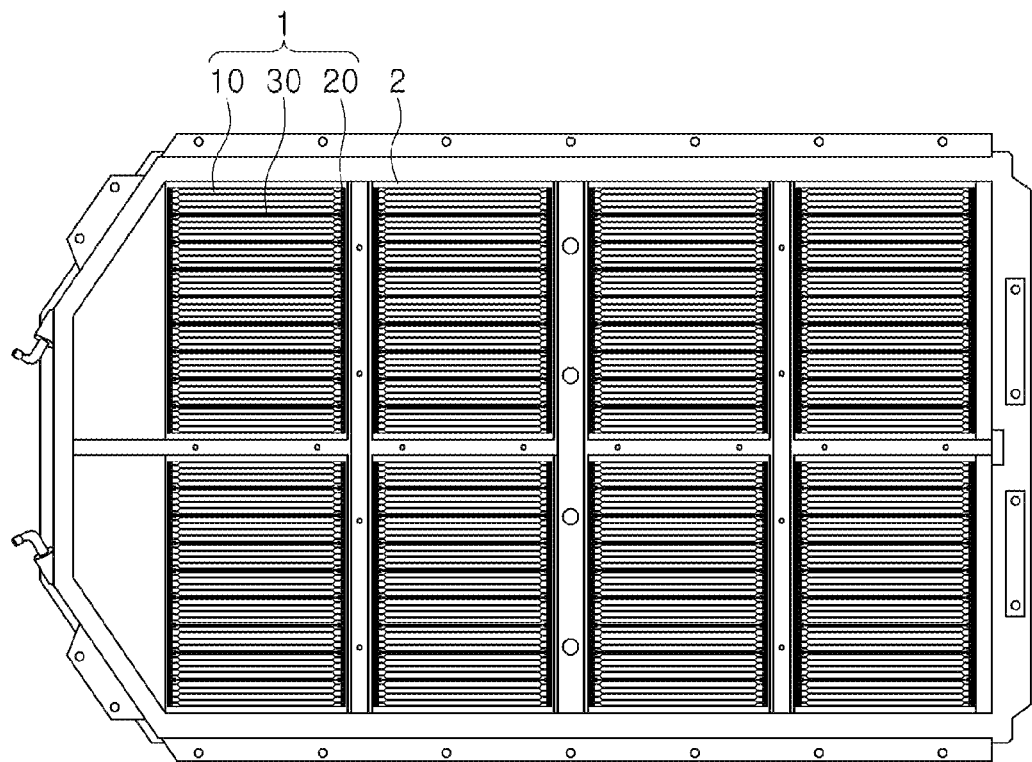
FIG. 11 is a plan diagram illustrating an example embodiment of a battery back.
Figure 12:
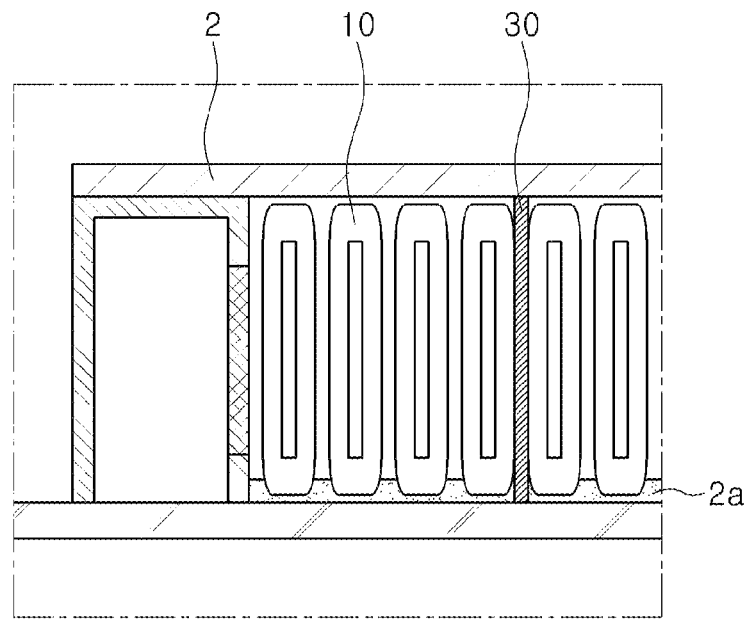
FIG. 12 is a diagram illustrating an example embodiment of a battery back, viewed from the side.

FIG. 11 is a plan diagram illustrating an example embodiment of a battery back. FIG. 12 is a diagram illustrating an example embodiment of a battery back, viewed from the side.

Referring to the drawings, a battery pack according to another example embodiment may include a plurality of battery cell assemblies 1 and a pack housing 2 for accommodating the plurality of battery cell assemblies 1.

Also, the battery cell assembly 1 may include a plurality of battery cells 10 including an electrode lead 11, a bus-bar assembly 20 coupled to the electrode lead 11, and a barrier disposed between the plurality of battery cells 10, opposing the battery cell 10, and one end of the barrier being fastened to the bus-bar assembly 20.

That is, using the battery pack in the example embodiment, the process of manufacturing the battery cell assembly 1 as a battery module may not be performed, and the battery cell assembly 1 may be installed in an electrical car in the form of a battery pack (cell to pack; CTP), such that electrical capacity of the battery pack may increase.

More specifically, by seating the battery cell assembly 1 below the pack housing 2 of the battery pack without the lower case included in the battery module, the space used for the lower case may be removed, and the size of the battery cell 10 may increase instead, such that overall electrical capacity of the battery pack may increase.

Also, the battery cell 10 of the battery pack according to another example embodiment may be seated on a thermal conductive material 2a applied to the pack housing 2.

That is, when the battery cell assembly 1 is seated in the lower housing of the battery pack, the thermal conductive material 2a may be interposed between the battery cell assembly 1 and the lower member of the pack housing 2 to cool the heat generated by the battery cell assembly 1

In particular, when a battery pack is configured using the above-described pouch-type battery cell 10, the battery cell 10 having a three-sided sealing structure may be used. The three-sided sealing structure may complete the battery cell 10 by sealing (sealing by thermal bonding) only three surfaces (left, right, and upper surfaces) of the pouch accommodating the electrode assembly, and since the other surface (bottom surface), which is not necessary to be sealed, may be formed to have a contact area greater than that of the sealed three surfaces, and accordingly, the other surface (bottom surface) not sealed may be in direct contact with the thermal conductive material 2a, such that thermal emission efficiency may improve.

According to the aforementioned example embodiment, the battery cell assembly and a battery pack including the same may have an effect of addressing the issue in which the battery cells may consecutively explode by flames or a gas generated by the explosion of one of the battery cells.

Also, in the battery cell assembly and the battery pack including the same, the barrier may be easily installed.

Also, by increasing the capacity of the battery cell, the overall capacity of the battery pack including the plurality of battery cell assemblies may increase.

While the example embodiments have been illustrated and described above, it will be apparent to those skilled in the art that modifications and variations could be made without departing from the scope of the present disclosure as defined by the appended claims.

What is claimed is:
1. A battery cell assembly, comprising:
a plurality of battery cells;
a bus-bar assembly to which electrode leads of the plurality of battery cells are coupled; and
a barrier interposed between the plurality of battery cells and coupled to the bus-bar assembly,
wherein the barrier is formed of a material including mica,
wherein the bus-bar assembly includes:
a bus-bar frame having a lead hole into which the electrode lead is inserted; and
a support tab protruding from the bus-bar frame toward the battery cells,
wherein an end of the barrier is inserted into the support tab, and
wherein the support tab includes:
a pair of side tabs protruding to oppose both side surfaces of the end of the barrier, respectively; and
a blocking tab opposing at least one of an upper portion and a lower portion of the end of the barrier and configured to connect the pair of side tabs to each other,
wherein the pair of side tabs are formed such that a lower end thereof protrudes further than an upper end from the bus-bar frame in a direction of the at least one of the battery cells,
wherein the upper end and the lower end of the side tab are disposed along a surface of the bus-bar frame, and
wherein the pair of side tabs are spaced apart from each other and form a gap, and a width of the gap of the lower end is greater than a width of the gap of the upper end.
2. The battery cell assembly of claim 1,
wherein the barrier includes:
a barrier plate opposing a side surface of the battery cell; and
a snap portion protruding from ends of the barrier plate to both sides configured to be caught on a hook formed on internal surfaces of the pair of side tabs.
3. The battery cell assembly of claim 2, wherein the snap portion are formed that a front surface opposing the bus-bar assembly is tapered.
4. The battery cell assembly of claim 1, wherein the barrier includes:
a barrier plate opposing a side surface of the at least one of the battery cells;
a seating block configured to protrude from a lower side surface of the end of the barrier plate in a direction of the bus-bar frame such that a lower end of the support tab is seated; and
a confinement post spaced apart from the barrier plate, configured to protrude upwardly from the seating block, and inserted into an accommodation groove formed upwardly from the lower end of the support tab.
5. The battery cell assembly of claim 1, wherein the barrier includes:
a barrier plate opposing a side surface of the at least one of the battery cells; and
a fastening block provided on a lower portion of the end of the barrier plate, configured to have a thickness greater than that of the barrier plate, and fastened to the bus-bar assembly by bolts.
6. The battery cell assembly of claim 1, wherein the barrier includes a buffer pad on an external surface.
7. The battery cell assembly of claim 1, wherein the electrode lead is welded and coupled to the bus-bar of the bus-bar assembly while an end thereof is disposed in a lead hole formed in the bus-bar assembly.

8. The battery cell assembly of claim 1, wherein the electrode lead penetrates through a lead hole formed in the bus-bar assembly and is bent to be welded and coupled to the bus-bar of the bus-bar assembly, and a first electrode lead disposed on one end of the bus-bar is bent in a direction opposite to a second electrode lead, the other electrode lead.

9. A battery pack, comprising:
a plurality of battery cell assemblies; and
a pack housing accommodating the plurality of battery cell assemblies,
wherein the plurality of battery cell assemblies include:
a plurality of battery cells including electrode leads;
a bus-bar assembly coupled to the electrode lead; and
a barrier interposed between the plurality of battery cells and coupled to the bus-bar assembly,
wherein the barrier is formed of a material including mica,
wherein the bus-bar assembly includes:
a bus-bar frame having a lead hole into which the electrode lead is inserted; and
a support tab protruding from the bus-bar frame toward the battery cells,
wherein an end of the barrier is inserted into the support tab,
wherein the support tab includes:
a pair of side tabs protruding to oppose both side surfaces of the end of the barrier, respectively; and
a blocking tab opposing at least one of an upper portion and a lower portion of the end of the barrier and configured to connect the pair of side tabs to each other,
wherein the pair of side tabs are formed such that a lower end thereof protrudes further than an upper end from the bus-bar frame in a direction of the at least one of the battery cells,
wherein the upper end and the lower end of the side tab are disposed along a surface of the bus-bar frame, and
wherein the pair of side tabs are spaced apart from each other and form a gap, and a width of the gap of the lower end is greater than a width of the gap of the upper end.

10. The battery pack of claim 9, wherein the plurality of battery cells are seated on a thermal conductive material disposed on the pack housing.

* * * * *